United States Patent
Cobianu et al.

(10) Patent No.: US 7,391,325 B2
(45) Date of Patent: Jun. 24, 2008

(54) MULTIFUNCTIONAL MULTICHIP SYSTEM FOR WIRELESS SENSING

(75) Inventors: Cornel P. Cobianu, Bucharest (RO); Ion Georgescu, Bucharest (RO); James D. Cook, Freeport, IL (US); Viorel V. Avramescu, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 336 days.

(21) Appl. No.: 11/331,722

(22) Filed: Jan. 13, 2006

(65) Prior Publication Data

US 2007/0164859 A1    Jul. 19, 2007

(51) Int. Cl.
*G08B 13/14* (2006.01)
(52) U.S. Cl. .............. 340/572.1; 340/572.4; 340/572.7; 340/572.8; 340/539.26; 340/10.1; 340/447; 235/385; 235/451; 235/492
(58) Field of Classification Search ............... 340/572.1, 340/572.4, 572.7, 572.8, 539.26, 10.1, 447; 235/385, 451, 492
See application file for complete search history.

(56) References Cited

U.S. PATENT DOCUMENTS

2005/0200539 A1* 9/2005 Forster et al. ............... 343/749
2006/0043198 A1* 3/2006 Forster ....................... 235/492

* cited by examiner

*Primary Examiner*—Tai Nguyen
(74) *Attorney, Agent, or Firm*—Kris T. Fredrick

(57) ABSTRACT

A multifunctional multichip system can operate in a passive mode by using at least one antenna to receive electromagnetic energy and using that energy to perform system functions. The system includes a sensor, an impedance matching circuit and an RFID module. The sensor produces a sensor signal containing a measurement. The RFID can produce an identification signal containing identification information. Alternatively, the RFID chip can be used in an addressing mode wherein the system only produces a signal in response to an addressing signal containing addressing information. The addressing signal is received from the electromagnetic field. In either mode, the sensor signal is coupled from the antenna into the electromagnetic field from which a receiver can obtain it. The signal can contain the identification information as well as the measurement. A matching network minimizes the effects of impedance mismatches between the system elements.

20 Claims, 6 Drawing Sheets

MULTIFUNCTIONAL MULTICHIP SYSTEM FOR WIRELESS SENSING

TECHNICAL FIELD

Embodiments relate to the fields of electronic packaging and sensor modules. Embodiments also relate to wirelessly communicating with sensors. Embodiments additionally relate to passive electronics systems that receive the energy needed for operating from an electromagnetic field.

BACKGROUND

In the past, sensor networks have been developed that can measure physical properties, such as pressure, and then communicate those measurements to locations where the measurements can be analyzed or stored. Most current sensor networks communicate using wires. The wires are used to supply power to the sensors and are also used for transmitting sensor signals. In general, a sensor receives energy through a wired electrical connection. The sensor uses the energy to produce a sensor measurement. The electronic circuit processing the signal from the sensor then encodes the sensor measurement into a sensor signal and transmits the sensor signal out through the wired electrical connection. A receiver obtains the sensor signal and recovers the sensor measurement.

A sensor measurement is not generally given directly as a real value of the measurand to be monitored and generally is without units. For example, a temperature sensor can return a sensor measurement of 5. The sensor measurement can be converted into a real temperature value by applying calibration information. Calibration information often takes the form of calibration coefficients. These coefficients can be obtained during a sensor calibration process. The calibration coefficients are used to build a bi-univocal mathematical correlation between the true physical value that is measured with a high accuracy by a reference sensor and the sensor's electrical response for that known value. In the example, the sensor measurement is 5 and the reference sensor produces a measurand of 50 degrees Celsius. Applying a multiplication calibration coefficient of 10 degrees Celsius to the value of 5 of the electrical response of our sensor can result in the true measurement of 50 degrees Celsius. This calibration coefficient of 10 degrees Celsius is then stored in the memory of the circuit for processing the signal from the sensor. Later, when the sensor produces a value of 5 due to the ambient temperature, the electronic circuit will multiply this value by the calibration coefficient and will indicate the real temperature of 50 Celsius degrees. In the general case, more complicated mathematical equations, with a large number of calibration coefficients are used for making the connection between the sensor measurement value and the real value of the measurand.

Some sensor networks use wireless sensors. A common approach is to use a battery to supply energy to the sensor. The sensor then wirelessly transmits the sensor signal to the receiver using electromagnetic waves. Battery powered wireless sensors are convenient because they do not require the costly and time consuming task of stringing wires. They do, however, require batteries. When batteries run out of energy, they must be replaced before the sensor can be used again.

Passive sensors are excited by an electromagnetic field. In other words, passive sensors obtain energy from an electromagnetic field. They typically have an antenna that converts the electromagnetic energy from an electromagnetic field into electrical energy to be applied to the sensor. The sensor then uses the energy to produce a sensor measurement and transmit a sensor signal.

FIG. 5, labeled as prior art, illustrates a sensor. The sensor has an active section 501 and a cover 503. An adhesive seal 502 is shown attaching the cover 503 to the active section 501. The adhesive seal 502 is one possible way to attachment method. For example, a quartz cover and a quartz active section as are desirable in many surface acoustic wave devices can be attached using glass frit technology or direct quartz to quartz bonding. A cover 503 is not required in all sensing applications but is often desirable in others. Minimizing stress when attaching a cover 503 to an active section 501 is necessary because stress on the active section 501 can negatively effect sensor operation.

Those skilled in the arts of radio communications, radio, or electromagnetic fields know of many different antenna configurations. These configurations range from simple dipole antennas to printed antennas, patch antennas, and spring antennas. Printed antennas are of particular current interest because they are printed or patterned directly onto a substrate, such as a printed circuit board, and are therefore extremely inexpensive to produce and integrate into an electronic system. Those skilled in the art of printed circuits, packaging, and system integration are aware of the numerous techniques for printing or patterning antennas and circuits onto substrates.

FIG. 6, labeled as prior art, illustrates a patch antenna. A substrate 607, such as a printed circuit board or kapton is patterned to have a patch 601 electrically connected to a first pad 603 by a wire 602. The other side of the substrate 607 has a ground plane 606 electrically connected to a second pad 605 by a second wire 604. In many applications, a through hole electrical connection will be used to make the electrical connection instead of the second wire 604.

FIG. 7, labeled as prior art, illustrates a spring antenna 701. A spring antenna 701 is simply a twisted or coiled piece of electrical conductor such as a wire.

Another passive wireless technology is radio frequency identification (RFID). An electromagnetic field excites an RFID module that contains identification information. Once excited, the chip transmits an identification signal containing the identification information. A typical use of an RFID module is to implant it in or attach it to cattle. The cattle are then tracked as they move through a detection area. The detection area has an electromagnetic field to excite the RFID module and a receiver to obtain the identification information.

In some RFID applications, the electromagnetic field contains an addressing signal. The addressing signal contains addressing information. The RFID module compares the addressing information to its own identification information. If the comparison reveals a match, then the RFID module transmits an identification signal. In this manner, a specific cow can be found in a herd. Such an application can be also seen at the monitoring and recognition of the trains that move through a certain fix position.

Matching networks can be used to couple signals between electronic components without losing too much energy. For example, the air through which an electromagnetic signal travels has a characteristic impedance. An antenna that receives the signal has a characteristic impedance. Furthermore, an electronic component has an input impedance and an output impedance. When a signal passes from one impedance to another, such as from an antenna to an electronic component, it loses energy. The energy loss can be minimized by matching the impedances. One way to match the impedances is to use an impedance matching network. Those skilled in the arts of electromagnetic fields or analog electronics know many impedance matching applications and solutions present in the real applications.

One use for a matching network is to match the impedances of an antenna and a surface acoustic wave (SAW) device. SAW devices are commonly used to filter signals or as sensors. Those skilled in art of SAW devices know of many varieties, applications, and uses of SAW devices.

Many sensors, particularly certain SAW sensors, require a cover that protects one side of the SAW sensor. The cover is often sealed against one side of the sensor. For many applications, a strain free seal is required because strain causes error in the sensor measurements.

Sensors, as discussed above, can operate passively to return a sensor measurement. However, passive sensors are rarely useful in applications requiring many sensors within a limited space. The reason is that the electromagnetic field stimulates all of the passive sensors and they all return sensor signals. The sensor signals interfere with one another and no signal is reliably read. Aspects of the embodiments directly address the shortcoming of current technology by producing an additional structure on a hybrid multifunctional system consisting of SAW sensor, printed antennas and other functional circuits without requiring additional processing steps.

BRIEF SUMMARY

It is therefore an aspect of the embodiments that a passive sensor, a radio frequency identification (RFID) module, a matching network, and an antenna are packaged together on a substrate. The antenna couples energy from an electromagnetic field and the energy is used to excite the matching network, RFID module, and sensor. The substrate can be a printed circuit board or similar substrate such that attaching electronic components to the substrate also establishes electrical connections between those electrical components. As such, the matching network can be electrically connected to the RFID module, antenna, and sensor.

It is a further aspect of the embodiments that the sensor has an active section and a cover. The cover is sealed to active section. When the sensor is mounted to the substrate, the cover fits into a hole in the substrate. As discussed above, a stress free seal between the active section and the cover is often required. The hole in the substrate ensures that the substrate does not create stress in the sensor or the active section. The active section produces a measurement.

It is a yet further aspect of the embodiments that the sensor produces a sensor signal that contains the measurement and that passes through the matching network to the antenna. The antenna couples the sensor signal into the electromagnetic field. A receiver can obtain the sensor signal, thereby obtaining the measurement, from the electromagnetic field.

Another aspect of the embodiments is that the RFID module contains identification information. The RFID module produces an identification signal that contains the identification information. A receiver receiving the identification signal and the sensor signal can use the identification information to identify the signal source. The RFID module can contain other useful information, such as calibration information. The calibration information can be included within the identification signal. A receiver obtaining the calibration information can use it to convert the sensor response, which has no unit of measure, into a real value of the measurand, based on the correlation between the sensor response and the true value of the measurand, as built during the calibration process.

Yet another aspect of the embodiments is that an antenna is electrically connected to the matching network. The antenna can be a spring antenna, printed antenna, or patch antenna. Furthermore, two or more antennas can be used.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
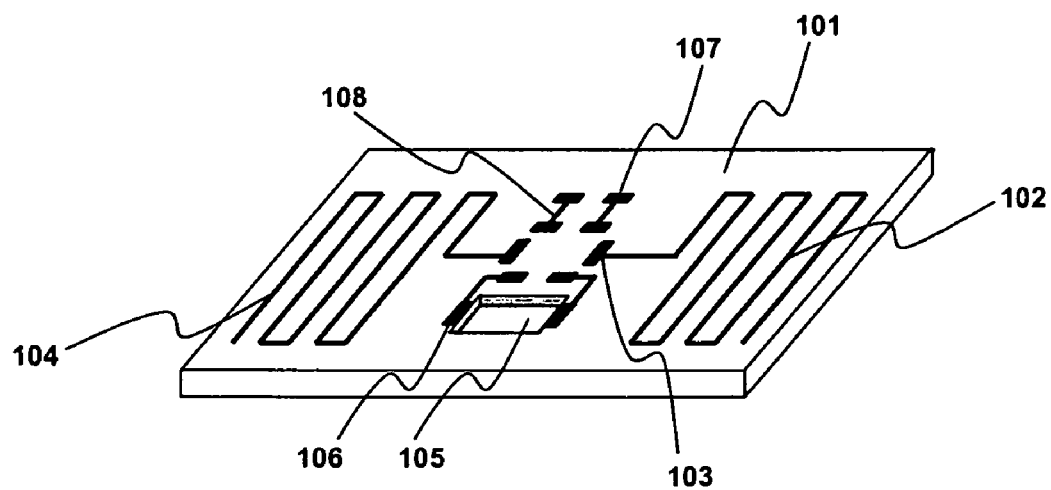
FIG. 1 illustrates a substrate before the attachment of components in accordance with aspects of the embodiments.

FIG. 1 illustrates a substrate 101 before the attachment of components in accordance with aspects of the embodiments. The substrate 101 can be a printed circuit board (PCB) or similar substrate onto which wires and pads can be printed or patterned. A first antenna 102 is printed on the substrate 101 and electrically connected to a matching network pad 103. A second antenna 104 is similarly patterned and connected. Drilling, punching, etching, or a similar technique can produce a hole 105 in the substrate 101. A sensor pad 106 is next to the hole 105. An RFID pad 107 is also printed on the substrate. A printed, electrically conductive wire 108 is one of the many printed wires creating electrical connections between various pads.

Figure 2:
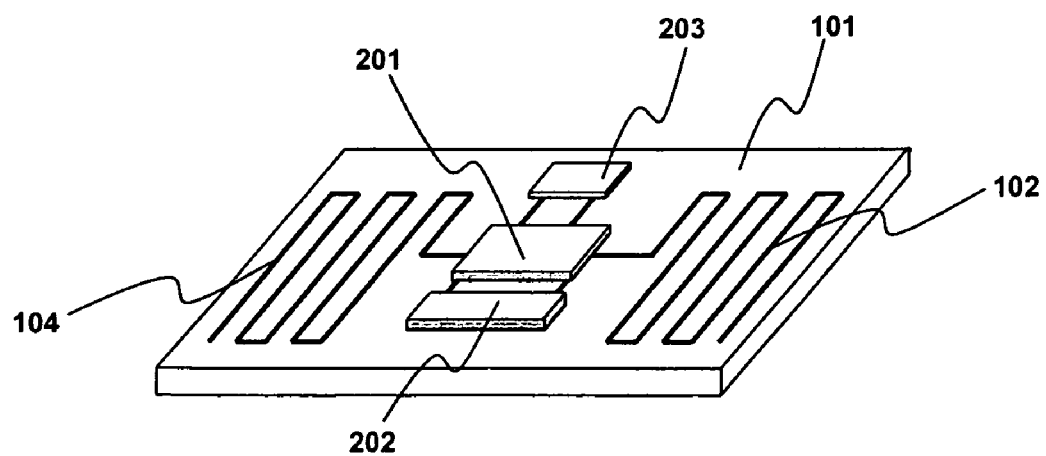
FIG. 2 illustrates a substrate after the attachment of components in accordance with aspects of the embodiments.

FIG. 2 illustrates a substrate 101 after the attachment of components in accordance with aspects of the embodiments. The first printed antenna 102 and the second printed antenna 104 are electrically connected to a matching network 201 because the matching network 201 is attached to the matching network pads. A sensor 202 is attached to the sensor pads. The sensor 202 has a cover (not shown) that fits into the hole. An RFID module 203 is attached to the RFID pads. As can be seen, the sensor 202, RFID module 203, and antennas 102, 104 are electrically connected to the matching network 201. In FIG. 2, the wireless sensor and the RFID chip are using the same antenna for sending the information to the receiver. In other cases, the RFID can have its own antenna with impedance matching to the RFID circuit. As an example, a printed type dipole antenna used with an RFID module operating at 915 MHz and a printed, meander-type antenna used with a SAW sensor operating at 434 MHz have already been proved to work with reduced cross talk during multifunctional system operation.

Figure 3:
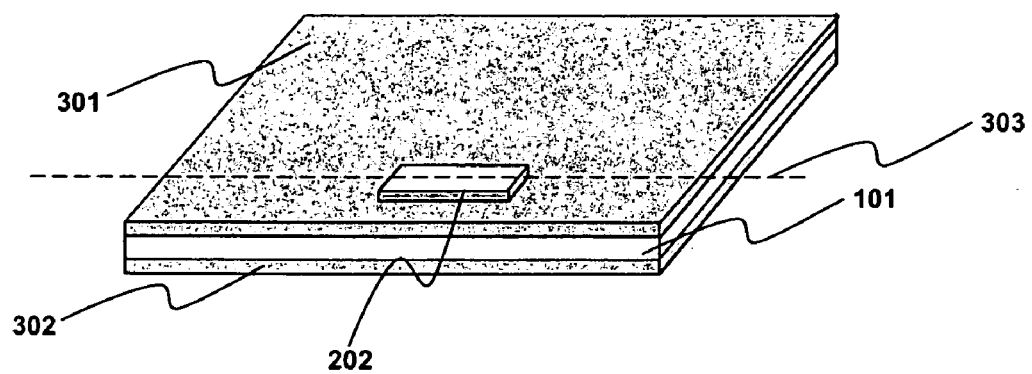
FIG. 3 illustrates a substrate after the attachment of components and after passivation in accordance with aspects of the embodiments.

FIG. 3 illustrates a substrate 101 after the attachment of components and after passivation in accordance with aspects of the embodiments. Passivation means that a protective material is layered on. In FIG. 3, a top passivation layer 301 is layered on top of the substrate 101 and a bottom passivation layer 302 is layered underneath the substrate 101. The top of the sensor 202 extends out of the top passivation layer 301. Passivation layers can be made of any dielectric material, typically a nonconductive material such as glass, epoxy, resin, rubber, or plastic. FIG. 3 also contains a cut line 303 clarifying the view presented in FIG. 4.

Figure 4:
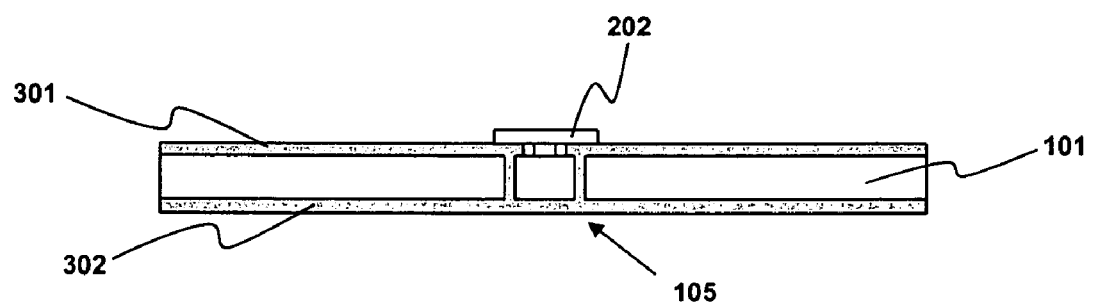
FIG. 4 illustrates a side view of a substrate after the attachment of components and after passivation in accordance with aspects of the embodiments.
Figure 5:
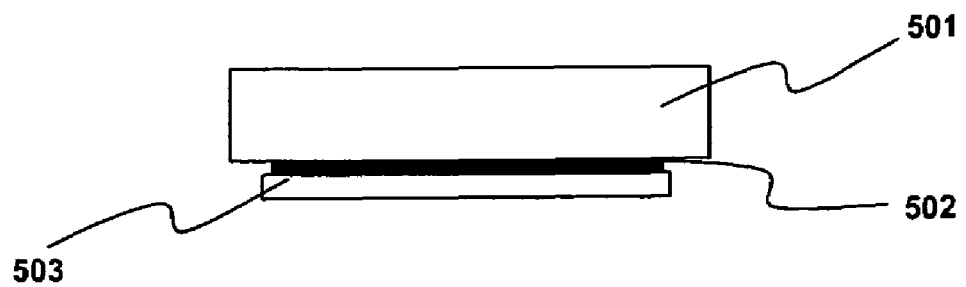
FIG. 5, labeled as prior art, illustrates a sensor.
Figure 6:
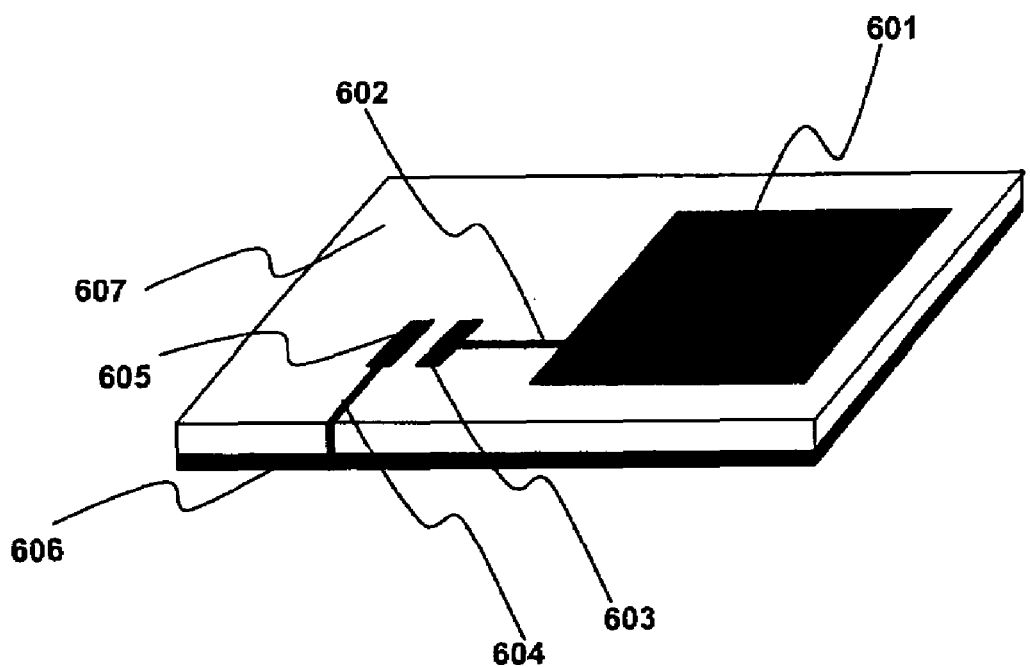
FIG. 6, labeled as prior art, illustrates a patch antenna.
Figure 7:
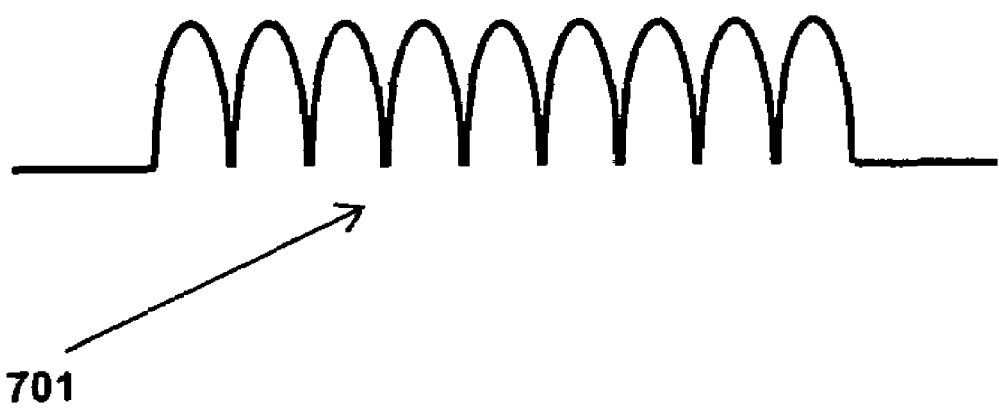
FIG. 7, labeled as prior art, illustrates a spring antenna.

FIG. 4 illustrates a side view along a cut line of a substrate 101 after the attachment of components and after passivation in accordance with aspects of the embodiments. Specifically, FIG. 4 is the sideview of the system illustrated in FIG. 3 along cut line 303. The substrate 101, top passivation layer 301 and bottom passivation layer 302 can be seen edge on. The sensor 202 can also be seen. The cover of the sensor 202 is accommodated in a hole 105 in the substrate 101, so that the height of the entire sensor is reduced.

Figure 8:
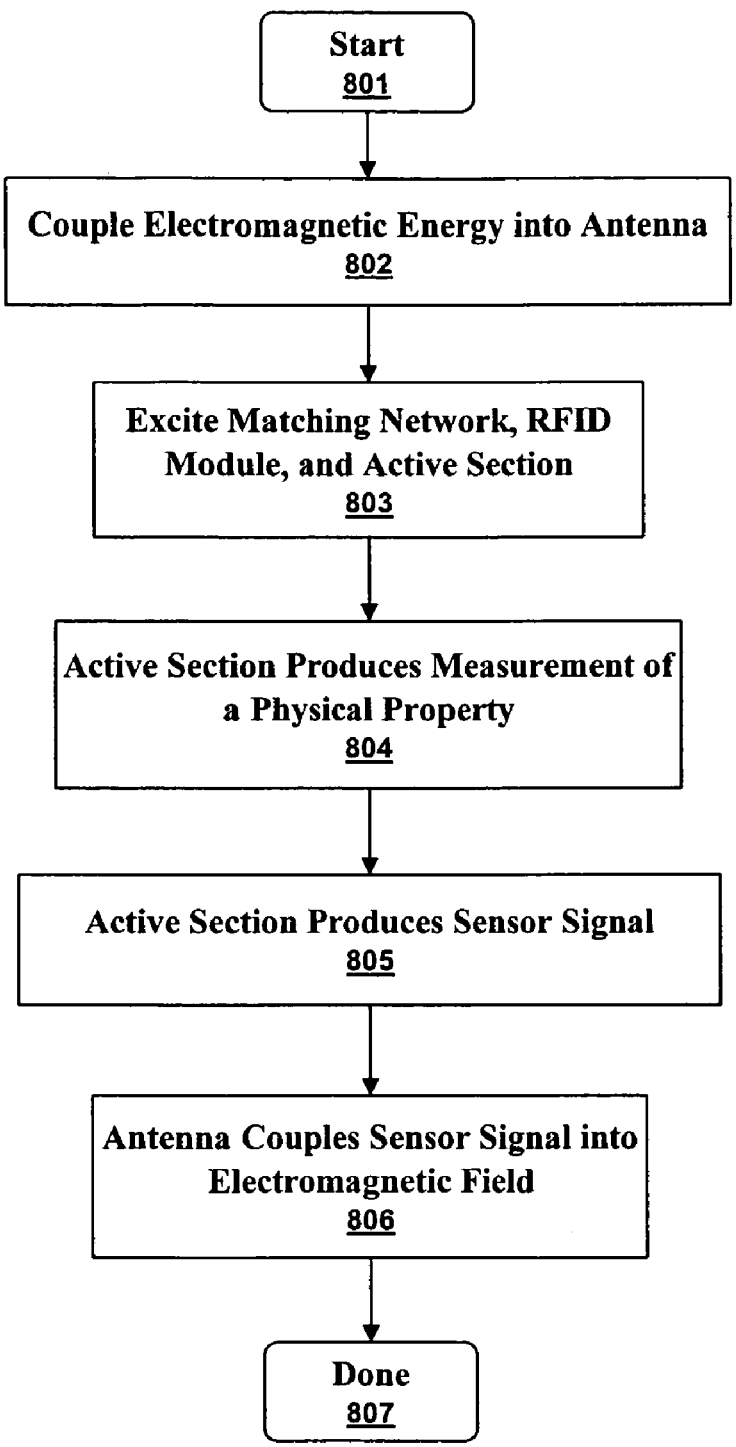
FIG. 8 illustrates a high level flow diagram of obtaining a signal from a multi-chip system in accordance with aspects of the embodiments.

FIG. 8 illustrates a high level flow diagram of obtaining a signal from a multi-chip system in accordance with aspects of the embodiments. After the start 801 energy from an electromagnetic field is converted into electrical energy by an antenna 802. The electrical energy is then used to excite, or power, the matching network. The matching circuit assures a maximum power transfer to the RFID module and to the active section of the sensor 803. The active section produces a measurement of a physical property 804, such as pressure or temperature. The active section then produces a sensor signal 805 that passes through the matching network to an antenna. The antenna converts the electrical sensor signal into the electromagnetic field 806 and the process is done 807.

Figure 9:
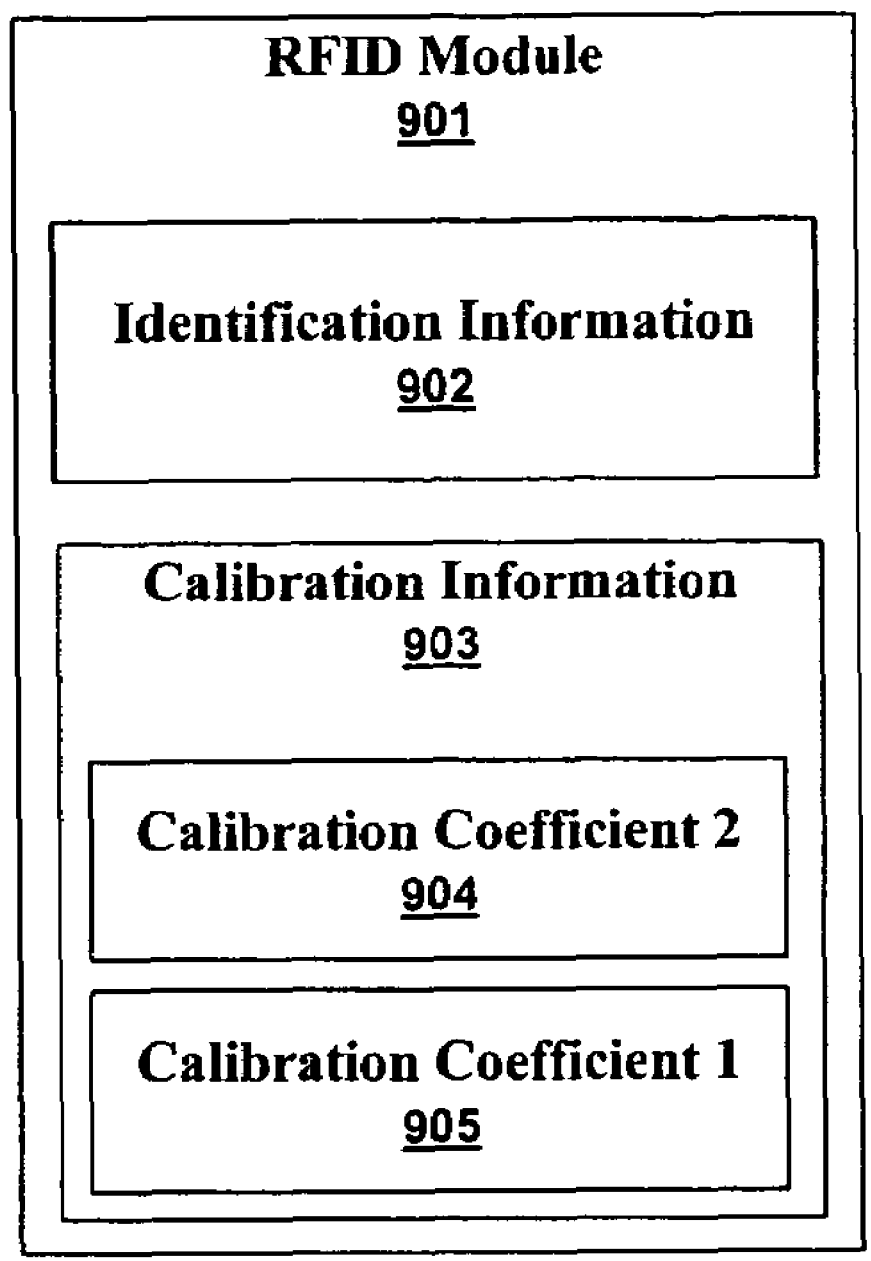
FIG. 9 illustrates a high level block diagram of information contained in an RFID module in accordance with aspects of the embodiments.

FIG. 9 illustrates a high level block diagram of information contained in an RFID module 901 in accordance with aspects of the embodiments. The RFID module 901 contains identification information 902 and calibration information 903. Here, the calibration information 903 contains a first calibration coefficient 905 and a second calibration coefficient 904.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
    a sensor comprising an active section and a cover wherein the active section produces a sensor electrical signal comprising a measurement value, wherein the sensor is mounted to a substrate and wherein the cover fits into a hole in the substrate;
    a matching network mounted to the substrate and electrically connected to the sensor;
    a RFID module mounted to the substrate and electrically connected to the matching network wherein the RFID module comprises an identification and produces an identification signal comprising identification information;
    at least one antenna electrically connected to the matching network wherein an electromagnetic field that is coupled into at least one of the at least one antenna supplies electrical energy to the system and wherein at least one of the at least one antenna couples the sensor electrical signal into the electromagnetic field thereby producing a passive wireless sensor.

2. The system of claim 1 wherein at least one of the at least one antenna is printed on the substrate.

3. The system of claim 1 wherein at least one of the at least one antenna is a patch antenna and wherein the patch antenna is printed on the substrate.

4. The system of claim 1 wherein at least one of the at least one antenna is a spring antenna.

5. The system of claim 1 wherein at least one of the at least one antenna couples the identification signal into the electromagnetic field.

6. The system of claim 5 wherein at least one of the at least one antenna is printed on the substrate.

7. The system of claim 5 wherein at least one of the at least one antenna is a patch antenna and wherein the patch antenna is printed on the substrate.

8. The system of claim 1 wherein the RFID module further comprises calibration information and wherein the identification signal comprises the calibration information.

9. A system comprising:
    a sensor comprising a SAW device and a cover wherein the SAW device produces a sensor signal comprising a measurement, wherein the sensor is mounted to a substrate and wherein the cover fits into a hole in the substrate;
    a matching network mounted to the substrate and electrically connected to the sensor;
    an RFID module mounted to the substrate and electrically connected to the matching network wherein the RFID contains an identification and produces an identification signal;
    at least one antenna electrically connected to the matching network wherein an electromagnetic field that is coupled into at least one of the at least one antenna supplies energy to the system and wherein at least one of the at least one antenna couples the sensor signal into the electromagnetic field thereby producing a passive wireless sensor.

10. The system of claim 1 wherein at least one of the at least one antenna is printed on the substrate.

11. The system of claim 1 wherein at least one of the at least one antenna is a patch antenna and wherein the patch antenna is printed on the substrate.

12. The system of claim 1 wherein at least one of the at least one antenna is a spring antenna.

13. The system of claim 1 wherein at least one of the at least one antenna couples the identification signal into the electromagnetic field.

14. The system of claim 5 wherein at least one of the at least one antenna is printed on the substrate.

15. The system of claim 5 wherein at least one of the at least one antenna is a patch antenna and wherein the patch antenna is printed on the substrate.

16. The system of claim 5 wherein at least one of the at least one antenna is a spring antenna.

17. A method comprising:
    coupling electrical energy from an electromagnetic field into an antenna that is electrically connected to a matching network wherein the matching network is also electrically connected to a sensor, wherein the matching network is electrically connected to an RFID module comprising identification information, wherein the sensor comprises an active section and a cover, and wherein the active section produces a measurement;

using the electrical energy to supply power to the matching network, the active section, and the RFID module;

producing a sensor signal from the sensor wherein the sensor signal comprises the measurement and coupling the sensor signal into the electromagnetic field; and producing an identification signal from the RFID module wherein the identification signal comprises the identification information and coupling the identification signal into the electromagnetic field thereby passively energizing and reading the RFID module.

18. The method of claim 17 wherein the active section comprises a SAW device.

19. The method of claim 17 wherein the RFID module further comprises calibration information and wherein the identification signal further comprises the calibration information.

20. The method of claim 19 further comprising coupling a return signal into the electromagnetic field, wherein the return signal comprises the sensor signal and the identification signal, and wherein the active section comprises a SAW device.

* * * * *